United States Patent [19]

Denis et al.

[11] Patent Number: 5,256,740

[45] Date of Patent: Oct. 26, 1993

[54] AMINO-SUBSTITUTED POLYMERS AND THEIR USE AS ADDITIVES FOR MODIFYING THE COLD PROPERTIES OF MIDDLE HYDROCARBON DISTILLATES

[75] Inventors: Jacques Denis, Charbonniere les Bains; Alain Forestiere, Vernaison; Béatrice Bonardi, Lyons; Bernard Damin, Oullins, all of France

[73] Assignee: IFP et Elf France, France

[21] Appl. No.: 876,312

[22] Filed: Apr. 30, 1992

[30] Foreign Application Priority Data

May 2, 1991 [FR] France ............... 91 05497

[51] Int. Cl.$^5$ ............... C08G 63/66; C08G 63/68; C09K 7/06; B01F 17/16
[52] U.S. Cl. ............... 525/419; 525/46; 525/451; 528/327; 528/341; 528/361; 252/357; 507/90
[58] Field of Search ............... 528/361, 327, 341; 525/419, 451, 46; 252/357; 507/90

[56] References Cited

U.S. PATENT DOCUMENTS

| | | | |
|---|---|---|---|
| 3,345,338 | 10/1967 | Merten et al. | 528/80 |
| 2,969,335 | 1/1961 | Simons | 528/292 |
| 4,135,887 | 1/1979 | Rossi | 44/62 |
| 4,614,726 | 9/1986 | Walters et al. | 502/41 |
| 5,001,202 | 3/1991 | Denis et al. | 528/341 |
| 5,106,515 | 4/1992 | Denis et al. | 507/90 |

FOREIGN PATENT DOCUMENTS 0271385 11/1987 European Pat. Off. .

*Primary Examiner*—John Kight, III
*Assistant Examiner*—Richard Lee Jones
*Attorney, Agent, or Firm*—Millen, White, Zelano, & Branigan

[57] ABSTRACT

Polymer with a number average molecular weight of 400 to 20,000 having amino-substituted groups in its molecule and resulting from the reaction of at least one compound having a secondary amine function with 1 to 60 carbon atoms on an unsaturated polyester resulting from the condensation of an unsaturated, aliphatic dicarboxylic compound having at least one alpha ethylene unsaturation of one of the carboxylic groups on at least one epoxidized compound having 2 to 62 carbon atoms chosen from among epoxyalkenes, ethers, epoxyalcohol esters and epoxyacid esters. Middle distillate composition having a distillation range of 150° to 450° C. and incorporating a minor proportion, preferably 0.001 to 2% by weight, of at least one of the aforementioned polymers.

20 Claims, No Drawings

AMINO-SUBSTITUTED POLYMERS AND THEIR USE AS ADDITIVES FOR MODIFYING THE COLD PROPERTIES OF MIDDLE HYDROCARBON DISTILLATES

BACKGROUND OF THE INVENTION

The present invention relates to modified polymers having amino-substituted side groups derived from compounds having a secondary amine function.

The polymers according to the invention can in particular be used as additives making it possible to improve the cold flow properties of middle hydrocarbon distillates (fuels and gas oils).

SUMMARY OF THE INVENTION

The modified polymers according to the invention result from the reaction of at least one compound having a secondary amine function in accordance with the hereinafter described general formula (I) R—NH—R' with a condensation polymer (unsaturated polyester), resulting from the condensation of at least one unsaturated, aliphatic dicarboxylic compound, preferably a neighbouring compound, having at least one alpha ethylene unsaturation of one of the carboxylic groups (hereinafter referred to as the dicarboxylic compound) and normally having 4 to 60, preferably 4 to 30 and most usually 4 to 8 carbon atoms in its molecule, with at least one aliphatic epoxide (hereinafter called epoxidized compound) complying with the general formula (ii) set forth infra.

It has surprisingly been discovered that the modified polymers of the present invention are additives permitting a significant improvement to the cold flow properties of the middle hydrocarbon distillates and in particular an improvement of the flow point and/or turbidity point of gas oils.

The condensation polymers used in preparing the modified polymers of the present invention are obtained by well known, condensation polymer preparation methods. Certain of these unsaturated polyesters are known as additives having an action on the flow point of crude oils and fuel oils (U.S. Pat. No. 4,135,887).

As will be shown in the following examples, the additives according to the invention have properties which are at least equivalent and in most cases superior (particularly with regards to the improvement of the flow point of gas oils) to those of the nitrogen additives described in patent application U.S. Pat. No. 5,001,202 and U.S. Pat. No. 5,106,515. The additives described in the aforementioned documents and obtained by the reaction of a primary amine on an unsaturated polyester suffer from the disadvantage of forming, at a temperature equal to or below 50° C., a more or less cloudy solution, in aromatic hydrocarbons such as toluene, which is a major disadvantage with regards to their large scale industrial use.

The dicarboxylic compound used in the present invention is normally preferably a monounsaturated compound with 4 to 8 carbon atoms per molecule, e.g. maleic, fumaric, itaconic, citraconic, mesaconic and glutaconic acid. The carboxylic compound is preferably a monounsaturated cyclic anhydride such as e.g. maleic anhydride, alkyl maleic anhydride and alkenyl-succinic anhydrides.

Within the scope of the invention, the preferred anhydrides are maleic anhydride, citraconic (methyl maleic) anhydride and itaconic (methylene-succinic) anhydride. The most frequently used anhydride is the maleic anhydride.

The epoxidized compound used within the scope of the present invention normally has 2 to 62, preferably 2 to 54, most usually 6 to 48 and advantageously 8 to 48 carbon atoms in its molecule. Very frequent use is made of epoxidized compounds having at least 8 and preferably at least 10 carbon atoms in their molecule.

Within the scope of the present invention, preference is given to the use of monoepoxidized compounds or mixtures of epoxidized compounds preferably incorporating a proportion of at least 50 molar % of monoepoxidized compounds and containing compounds having several epoxide groups (oxiran cycles) in their molecule, e.g. two or three epoxide groups. The molar proportion of these compounds, referred to as polyepoxidized compounds, in the mixture of epoxidized compounds is normally below 50%, preferably below 40% and advantageously below 30%. Among the most widely used epoxidized compounds reference can be made to substantially linear monoepoxy alkanes (i.e. whereof at the most 20% of the carbon atoms are in the side methyl and/or ethyl groups) and which are preferably terminal.

The aliphatic epoxidized compounds used in the present invention normally comply with the following general formula (II):

in which $R^1$ and $R^3$, which can be the same or different, in each case represent a hydrogen atom or a lower alkyl group e.g. having 1 to 4 carbon atoms, such as methyl, ethyl, propyls and butyls; $R^2$ and $R^4$, which can be the same or different, each represent a hydrogen atom, an alkyl group, which is preferably substantially linear, having 1 to 60, preferably 1 to 38 and more particularly 4 to 38 carbon atoms, an alkoxyalkyl group of formula $R^5$—O—$R^6$, in which $R^5$ represents a preferably substantially linear alkyl group with 1 to 59, preferably 1 to 37 and more particularly 1 to 25 carbon atoms and $R^6$ represents a preferably substantially linear alkylene group having 1 to 59 and preferably 1 to 37 carbon atoms, the sum of the carbon atoms of $R^5$ and $R^6$ normally being 2 to 60, preferably 2 to 38 and more particularly 4 to 38.

In the formula of the epoxidized compound described hereinbefore, $R^2$ can also represent an alkoxycarbonyl alkylene group of formula

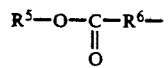

or an alkyl carbonyl oxyalkylene group of formula

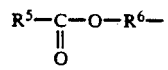

in which $R^5$ and $R^6$ have the definitions given hereinbefore.

The preferred monoepoxidized compounds are those in which $R^1$ and $R^5$ each represent a hydrogen atom, as well as those in which $R^1$, $R^3$ and $R^4$ each represent a hydrogen atom.

Examples of preferred monoepoxidized compounds are those in which $R^1$, $R^3$ and $R^4$ each represent a hydrogen atom and $R^2$ represents a substantially linear alkyl group having 6 to 46 carbon atoms; a substantially linear alkoxyalkyl group of formula $R^5$—O—$R^6$, a substantially linear alkoxy carbonyl alkylene group of formula

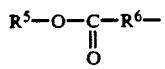

or a substantially linear alkyl carbonyloxyalkylene group of formula

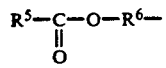

in which $R^5$ represents a substantially linear alkyl group having 1 to 45, and preferably 1 to 25 carbon atoms and $R^6$ represents a substantially linear alkylene group having 1 to 45 and preferably 5 to 45 carbon atoms in the case of the alkoxy carbonyl alkylene group, the sum of the carbon atoms of $R^5$ and $R^6$ preferably being 6 to 46.

Other examples of preferred monoepoxidized compounds are those in which $R^1$ and $R^3$ each represent a hydrogen atom and $R^2$ and $R^4$, which can be the same or different, each represent a hydrogen atom or an alkyl group, which is substantially linear and has 1 to 60 and preferably 1 to 46 carbon atoms (substantially linear monoepoxyalkane), as well as compounds in which $R^4$ represents a hydrogen atom or an alkyl group, which is substantially linear, as defined hereinbefore and $R^2$ represents an alkoxy carbonyl alkylene group as defined hereinbefore.

Specific examples of aliphatic monoepoxidized compounds are ethylene oxide, propylene oxide, 1,2-epoxybutane, 1,2-epoxypentane, 1,2-epoxyhexane, 1,2-epoxyheptane, 1,2-epoxyoctane, 1,2epoxynonane, 1,2-epoxydecane, 1,2-epoxyundecane, 1,2-epoxydodecane, 1,2-epoxytetradecane, 1,2-epoxypentadecane, 1,2-epoxyhexadecane, 1,2-epoxyheptadecane, 1,2-epoxyoctadecane, 1,2-epoxynonadecane, 1,2-epoxyeicosane, 1,2-epoxydocosane, 1,2-epoxytetracosane, 1,2-epoxyhexacosane, epoxidized polybutenes having a number average molecular weight ($\overline{Mn}$) between 100 and approximately 1000, 2,3-epoxybutane, 2,3-epoxypentane, 2,3-epoxyhexane, 3,4-epoxyheptane, 2,3-epoxyoctane, 3,4-epoxyoctane, 3,4-epoxydecane, 9,10-epoxyoctadecane, 3-ethoxy-1,2-epoxypropane, 3-propoxy-1,2-epoxypropane, 3-butoxy-1,2-epoxypropane, 3-pentyloxy-1,2-epoxypropane, 3-hexyloxy-1,2-epoxypropane, 3-heptyloxy-1,2-epoxypropane, 3-octyloxy-1,2-epoxypropane, 3-decyloxy-1,2-epoxypropane, 3-dodecyloxy-3-hexyloxy-1,2-epoxypropane, 1-acetoxy-2,3-epoxypropane, 1-butyryloxy-2,3-epoxypropane, 1-lauroyloxy-2,3-epoxypropane, 3-myristoyloxy-1,2-epoxypropane, 3-palmitoyloxy-1,2-epoxypropane, 3-stearoyloxy-1,2-epoxypropane, alkyl esters, e.g. methyl, ethyl, propyl, butyl, 2-ethyl hexyl and hexadecyl esters of 3,4-epoxybutanoic, 4,5-epoxypentanoic, 3,4-epoxynonanoic, 10,11-epoxyundecanoic, 6,7-epoxyoctadecanoic, 12,13-epoxyoctadecanoic, 11,12-epoxyoctadecanoic, 9,10-epoxyoctadecanoic, 11,12-epoxyeicosanoic and 13,14-epoxydocosanoic.

As specific examples of mixtures of epoxidized compounds incorporating polyepoxides, reference can be made to the mixture of alkyl esters obtained by the esterification of a mixture of epoxy acids resulting from the epoxidation of a mixture of ethylenically unsaturated fatty acids.

The mixture of ethylenically unsaturated fatty acids is e.g. a mixture containing in the approximate weight proportions given in the following Table I, acids having 12 to 20 carbon atoms in their molecule and containing saturated and unsaturated acids. This mixture is normally referred to as olein.

TABLE I

| Acids | C* 12 | C* 14 | C 14.1 | C* 15 | C* 16 | C 16.1 | C 17.1 | C* 18 | C 18.1 | C 18.2 | C 18.3 | C 20.1 |
|---|---|---|---|---|---|---|---|---|---|---|---|---|
| % by weight | 0.8 | 2.7 | 1.0 | 0.5 | 5.0 | 5.5 | 1.5 | 1.5 | 68.0 | 10.0 | 2.5 | 1.0 |

*saturated acids.

In the above Table I, $C_{p.1}$ designates acids having an ethylenic unsaturation $C_{p.2}$ designates acids having 2 ethylenic unsaturations and $C_{p.3}$ designates acids having 3 ethylenic unsaturations (p being the number of carbon atoms).

For the esterification of the mixture of epoxy acids, use is e.g. made of a mixture of alcohols containing, in approximate weight proportions, 95% n-hexadecyl alcohol, 3% n-octadecyl alcohol and 2% alcohols having more than 18 carbon atoms in their molecule. It must be understood that it is possible to use as the epoxidized compound one or more compounds complying with the formula (II).

The unsaturated polyester is normally obtained by reacting at least one dicarboxylic compound (as defined hereinbefore) with at least one epoxidized compound (as defined hereinbefore) in the presence of a condensation catalyst, e.g. a strong acid or a titanium salt, e.g. alkyl titanate and in particular n-butyl titanate.

The condensation between at least one dicarboxylic compound and at least one epoxidized compound can be carried out in the presence or absence of a solvent. It is e.g. possible to use a hydrocarbon solvent such as benzene, hexane, cyclohexane, toluene, xylene or a mixture of hydrocarbons such as e.g. a hydrocarbon fraction having a high boiling point, such as a kerosene or a gas oil.

The condensation reaction is normally performed at a temperature of approximately 30° to 200° C. and preferably approximately 50° to 160° C. for between approximately 30 minutes and approximately 30 hours and preferably between approximately 2 and approximately 15 hours.

The condensation between the dicarboxylic compound and the epoxidized compound is carried out by using quantities of each of the compounds such that the molar ratio of the epoxidized compound to the dicarboxylic compound is normally approximately 0.4:1 to 1.8:1, preferably 0.8:1 to approximately 1.2:1 and more particularly approximately 0.9:1 to approximately 1.1:1.

The thus obtained unsaturated polyester is then reacted with at least one compound having a secondary amine function, as defined hereinafter. The reaction is normally performed in the presence of a solvent, which can be the same as or differ from that used in the unsaturated polyester preparation stage.

When the solvent used in this addition reaction of the compound having an amine function is the same as that used during the formation of the polyester, it is possible not to isolate the polyester and to carry out the reaction on the crude polycondensation product, optionally after removing the catalyst employed for the polycondensation.

When polycondensation has been carried out without using a solvent, the polyester is preferably firstly dissolved with a solvent quantity normally representing by weight the weight of the polyester formed and then the addition reaction takes place with the compound having a secondary amine function.

The compounds having a secondary amine function used normally have 2 to 61, preferably 6 to 56 and more particularly 8 to 56 carbon atoms in their molecule. The most frequently used compounds have at least 12 and preferably at least 16 carbon atoms in their molecule. These compounds with a secondary amine function comply with the following general formula: (I) R—N—H—R', in which R and R', which can be the same or different, in each case represent an aliphatic group having 1 to 60 and preferably 5 to 30 carbon atoms. The groups R and R' are preferably substantially linear (i.e. at the most 20% of the carbon atoms are inside methyl and/or ethyl groups) and most usually are saturated. Most frequently use is made of symmetrical or non-symmetrical, linear dialkyl amines.

Reference is made to the following specific examples of symmetrical amines: dipropyl amine, dibutyl amine, dipentyl amine, dihexyl amine, diheptyl amine, dioctyl amine, dinonyl amine, didecyl amine, didodecyl amine, ditridecyl amine, ditetradecyl amine, dipentadecyl amine, dihexadecyl amine, diheptadecyl amine, dioctadecyl amine, dinonadecyl amine, dieicosyl amine, didocosyl amine and ditetracosyl amine.

As specific examples of non-symmetrical amines reference can be made to N-methyl butyl amine, N-ethyl butyl amine, N-propyl dodecyl amine, N-butyl dodecyl amine and N-pentyl tridecyl amine. Reference can also be made to mixtures of secondary amines such as the commercial mixtures sold under the names Armeen 2C, Armeen 2HT and Armeen 2S by ARMAK (Ullmanns's Encyclopedia of Industrial Chemistry, 5th edition, Vol. A2, pp. 8,19 and 25).

It must be understood that it is possible to use as the compound having a secondary amine function one or more compounds complying with formula (I). The addition reaction of the compound having a secondary amine function on the unsaturated polyester is normally carried out by heating to a temperature of normally 25° to 200° C., preferably 40° to 160° C. and e.g. approximately 60° C. The reaction takes place by adding the compound having the secondary amine function to the unsaturated polyester dissolved in a solvent e.g. chosen from among those mentioned hereinbefore, and heating at the chosen temperature for a time adequate for the reaction to be substantially complete. The duration of the reaction between the compound having the secondary amine function and the unsaturated polyester is normally approximately 1 to 24 hours, most usually approximately 2 to 10 hours and e.g. approximately 3 hours. The quantity of the compound having a secondary amine function reacted is normally 0.2 to 1.5 mole, preferably 0.4 to 1.2 mole and in more preferred manner 0.4 to 1 mole per mole of dicarboxylic compound used in the formation of the unsaturated polyester. The quantity of compound having an amine function is e.g. approximately 0.5 mole for 1 mole of dicarboxylic compound.

The modified polymers of the present invention, which can be advantageously used as additives in middle distillates of petroleum are those having substantially linear pendant side chains with at least 8, preferably at least 10 and in a particularly preferred manner at least 12 carbon atoms. These side chains can either come from the epoxidized compound used in the preparation of the unsaturated polyester, or from the compound having the secondary amine function reacted with the unsaturated polyester, or both the epoxidized compound and the compound having the secondary amine function.

Preferably, the modified polymers according to the invention, used as additives in middle distillates, are those which have pendant side chains with at least 8, advantageously at least 10 and in a more preferred manner at least 12 carbon atoms obtained both from the epoxidized compound used in the preparation of the unsaturated polyester and from the compound having the secondary amine function reacted with the unsaturated polyester.

The modified polymers according to the invention normally have a number average molecular weight of approximately 400 to 20,000, preferably approximately 500 to 10,000 and most frequently approximately 500 to 8,000.

The preferred modified polymers according to the invention, as defined hereinbefore, make it possible to simultaneously bring about an improvement to the turbidity point and the flow point of middle petroleum distillates, which makes them particularly attractive to the refiner.

The additives are obtained in solution in the chosen solvent and can be used in this form directly in middle petroleum distillates (e.g. in gas oils), whose flow and turbidity points are to be improved. This solution has the advantage of being perfectly clear at 50° C.

In order to observe a marked simultaneous improvement to the turbidity point and the flow point of the gas oil fractions considered in the invention and defined hereinafter, it is necessary to add these additives in concentrations of e.g. 0.001 to 2% by weight, preferably 0.01 to 1% by weight and more advantageously 0.02 to 0.3% by weight.

The gas oil compositions according to the invention contain a major proportion of middle petroleum distillate with a distillation range according to the distillation standard ASTM D 8667 between 150° and 450° C. (fuel oils, gas oils) and a minor proportion, adequate to bring about a simultaneous reduction of the turbidity and flow points, of at least one modified polymer as defined hereinbefore. The considered gas oils have a distillation range between an initial temperature of approximately 160° to 190° C. to a final temperature of approximately 360° to 430° C.

The gas oil compositions containing a major proportion of middle distillate and at least one additive chosen from polymers modified according to the invention and defined hereinbefore, in a quantity adequate to reduce both the turbidity and flow points, can also contain other additives, such as e.g. antioxidants, sludge-dispersing additives, corrosion inhibitors, etc. The compositions normally contain at least 95% and preferably at least 98% by weight of middle distillate.

The lowering of the flow point can e.g. extend to 21° C. or more. It is also possible to simultaneously observe a lowering of the turbidity point, which can e.g. extend to 3° C. or more.

The modified polymers used in the invention make it possible, by their action on the kinetic crystallization phenomena, particularly of paraffins, and on the modification of the size of the crystals which form, to use the suspension at a lower temperature without blocking the pipe or clogging the filters.

When the crystals of paraffins, whose formation is caused by cooling, appear, their natural tendency is to collect by gravity in the lower part. This phenomenon, known as sedimentation, leads to the blocking of pipes and the clogging of filters and is prejudicial to the satisfactory use of middle distillates and in particular domestic fuel and gas oils at low temperature. The modified polymers according to the invention decrease the sedimentation rate of paraffins formed by the cooling of gas oils and other middle distillates. The paraffins tend to remain more in suspension and are deposited less on the walls of pipes in contact with gas oils and other middle distillates, thus leading to a slowing down of the blocking of such pipes, so that it is possible to use a product having given characteristics at a temperature which is much lower or to use at a given temperature a product which, obtained by the refiner without modifying the distillation plan, did not initially have the requisite specifications, which at present evolve in the sense of a greater severity.

The following examples illustrate the invention without limiting the scope thereof.

In the examples, the gas oil fractions used are those appearing in Table II and are characterized on the basis of Standard ASTM D 8667, the gas oil fractions from ARAMCO being designated G1 and G2, whilst their density is also given in Table II.

For additive-free fractions G1 and G2 and for compositions containing an additive, two determinations were made. The turbidity point was determined according to a more accurate method than Standard ASTM D 2500. The pipes are the same and the temperature drop takes place by a cooling bath regularly programmed to a level of 0.5° C./minute. The turbidity point is detected by a sudden variation of the optical density determined by an optical fibre. The temperature is indicated by a thermocouple located in the vicinity of the optical fibre. It is determined to within 0.1° C. The flow point is determined according to Standard ASTM D 97.

TABLE II

| Gas Oils | ASTM Distillation | | % distilled at 300° C. | Density at 15° C. in kg/l | n-paraffins, % by weight |
|---|---|---|---|---|---|
| | Pi °C. | Pf °C. | | | |
| G1 | 171 | 363 | 70.6 | 0.837 | 14 |
| G2 | 178 | 357 | 71 | 0.831 | 16 |

EXAMPLE 1

Into a 2 liter reactor equipped with a condenser and a stirring system are introduced 246.7 g (2.56 moles) of maleic anhydride, 720 g (2.56 moles) of 5.6% by weight oxygen epoxyhexadecane and then 29.6 g (0.0755 mole) of n-butyl titanate and 249 g of toluene. The mixture is heated to 80° C. and this temperature is maintained for 12 hours, accompanied by stirring. This gives an unsaturated polyester in the form of a clear brown liquid, which can be characterized by conventional analysis means. Its IR spectrum reveals the disappearance of bands due to maleic anhydride at 1850 cm$^{-1}$ and 1780 cm$^{-1}$ and the appearance of a strong ester band at 1720 cm$^{-1}$. Gel chromatography reveals a 90 to 95% conversion of maleic anhydride and epoxyhexadecane. The polyester obtained in solution at 80% by weight in the toluene constitutes the mother solution of the additive.

EXAMPLES 2 to 9

Compounds having amine functions are added to different parts of the mother solution obtained in Example 1 and which contains the unsaturated polyester.

EXAMPLE 2

Into a 250 ml reactor equipped with a condenser and a stirring system are introduced 20.1 g of the mother solution of Example 1, i.e. 0.041 molar equivalent of maleic anhydride and 13.39 g, i.e. 0.027 molar equivalent (0.55 for 1) of a secondary fatty amino fraction, whose alkyl chains have on average in molar % 1 $C_{14}$, 5 $C_{16}$, 42 $C_{18}$, 12 $C_{20}$ and 40 $C_{22}$ and then 25.5 g of toluene. After heating for 1 hour at 80° C. and 2 hours at 110° C. (reflux) under nitrogen and accompanied by stirring, a clear brown solution is obtained constituted by 1 to 50% by weight additive in the toluene. Infrared spectrometry reveals the disappearance of the band at 1650 cm$^{-1}$ corresponding to the secondary amine. On heating the solution to 50° C., it becomes perfectly clear. The product solidifies at ambient temperature (20° C).

EXAMPLE 3

The same secondary fatty amine fraction as in Example 2 is added under the same conditions, but in a different quantity to correspond to 0.75 molar equivalent of amine per molar equivalent of maleic anhydride in the polyester. This gives a solution of additive 2, which is clear at 50° C. The product solidifies at ambient temperature (20° C.).

EXAMPLES 4 and 5

Another secondary fatty amine fraction, whose alkyl chains have on average in molar % 1 $C_{14}$, 28 $C_{16}$ and 71 $C_{18}$ is reacted under the same conditions as in Examples 2 and 3 with the mother solution of the additive constituted by unsaturated polyester and in equivalent molar proportions of 0.55 and 0.75 for 1 molar equivalent of maleic anhydride in the polyester. This gives additives 3 and 4 with 50% by weight in the toluene. These solutions are perfectly clear at 50° C.

EXAMPLES 6 and 7 (Comparison)

For comparison, a primary fatty amine fraction, whose alkyl chains contain approximately in molar % 1 $C_{14}$, 5 $C_{16}$, 42 $C_{18}$, 12 $C_{20}$ and 40 $C_{22}$ is reacted with the same unsaturated polyester solution as in Example 1, under the same conditions as in the preceding examples and in equivalent molar proportions of 0.55 and 0.75 for 1 molar equivalent of maleic anhydride in the polyester. This gives additives 5 and 6 with 50% by weight in the toluene. These solutions are cloudy or slightly cloudy at 50° C.

EXAMPLES 8 and 9 (Comparison)

Once again for comparison, a primary fatty amine fraction, whose alkyl chains contain approximately 1% $C_{14}$, 28% $C_{16}$ and 71% $C_{18}$, is reacted with the same unsaturated polyester solution as in Example 1, under the same conditions as in the preceding examples and in equivalent molar proportions of 0.55 and 0.75 for 1 molar equivalent of maleic anhydride in the polyester. This gives additives 7 and 8 in 50% by weight in the toluene. These solutions are cloudy or slightly cloudy at 50° C.

EXAMPLE 10

In the same way as in Example 1 an unsaturated polyester was prepared, which differs from that of Example 1 in that use is made of a hexadecyl epoxy stearate fraction as the epoxidized compound. This fraction was obtained by epoxidizing olein (mixture of unsaturated fatty acids, whose average weight composition is given in Table I), followed by esterification of the epoxy acid mixture obtained, by an alcohol fraction containing in approximate weight proportions 95% n-hexadecyl alcohol, 3% n-octadecyl alcohol and 2% alcohol having more than 18 carbon atoms in their molecule. This gives an unsaturated polyester, which is diluted by a toluene quantity such that a 50% by weight polyester solution is obtained.

On part of this solution there is then an addition of a secondary fatty amine fraction, whose alkyl chains contain on average in molar % 1 $C_{14}$, 5 $C_{16}$, 42 $C_{18}$, 12 $C_{20}$ and 40 $C_{22}$, following the operating procedure described in Example 2 and respecting the molar proportions therein. The infrared spectrum confirms the addition of the secondary amine compound to the double bond. This gives a clear solution at 50° C. of additive 9 with 50% by weight in the toluene.

EXAMPLE 11

In the same way as in Example 1 an unsaturated polyester is prepared, which differs from that of Example 1 in that use is made of n-1-butoxy-2,3-epoxypropane as the epoxidized compound. This gives an unsaturated polyester in the form of a yellow product, which can be characterized by conventional analysis means. Its IR spectrum shows the disappearance of the bands due to the maleic anhydride at 1850 and 1780 cm$^{-1}$ and the appearance of a strong ester band at 1720 cm$^{-1}$. The thus formed polyester is diluted by toluene, so as to obtain a solution of polyester in toluene at 50% by weight.

On part of this solution addition then took place of a secondary fatty amine fraction, whose alkyl chains contain on average in molar % 1 $C_{14}$, 5 $C_{16}$, 42 $C_{18}$, 12 $C_{20}$ and 40 $C_{22}$, following the operating procedure described in Example 2 and respecting the molar proportions of Example 2. The infrared spectrum confirms the addition of the secondary amine compound to the double bond. This gives a 50% by weight solution of additive 10 in toluene and which is clear at 50° C.

The aforementioned additives, dissolved 50% in toluene, were incorporated at a rate of 0.05 and 0.1% by weight in gas oils G1 and G2, whose characteristics were given in Table II. The turbidity and flow point determinations were then carried out. The results of these determinations appear in Table III. They show that the best compromise for 0.05% by weight additives in the gas oil, by lowering the turbidity and flow points and in appearance, is obtained for additives 1 and 2 synthesized with an epoxy alkane and the fraction of longer secondary amines.

Additives 3 and 4 synthesized with a fraction of shorter secondary amines are clear at 50° C., but are less effective with respect to the turbidity point. Additives 5 to 8 synthesized for comparison purposes with secondary amine fractions give additives whose efficiency, particularly with regards to the flow point, is more limited and whose solutions in toluene are turbid at 50° C. Additives 9 and 10 have properties which are slightly inferior to those of additives 1 to 4 for the same clearness at 50° C.

TABLE III

| Additives % by weight | Turbidity point (°C.) G1 | Turbidity point (°C.) G2 | Flow point (°C.) G1 | Flow point (°C.) G2 | Appearance of additive: 50% by weight solution of active material. at 50° C. |
|---|---|---|---|---|---|
| None | −6 | −6.2 | −9 | −9 | |
| Additive 1 | | | | | clear |
| 0.05% | −8.5 | −8.0 | −27 | −21 | |
| 0.1% | −9.6 | −8.8 | −27 | −21 | |
| Additive 2 | | | | | clear |
| 0.05% | −8.6 | −7.9 | −27 | −21 | |
| 0.1% | 9.6 | −8.8 | −27 | −21 | |
| Additive 3 | | | | | clear |
| 0.05% | −7.4 | −7.6 | −30 | −24 | |
| 0.1% | −8.4 | −8.4 | −30 | −27 | |
| Additive 4 | | | | | clear |
| 0.05% | −7.4 | −7.7 | −30 | −24 | |
| 0.1% | −8.6 | −8.6 | −30 | −27 | |
| Additive 5 | | | | | turbid |
| 0.05% | −9.0 | 8.0 | −18 | −12 | |
| 0.1% | −9.7 | −8.6 | −18 | −12 | |
| Additive 6 | | | | | turbid |
| 0.05% | −8.6 | −8.4 | −15 | −12 | |
| 0.1% | −9.6 | −8.6 | −15 | −9 | |
| Additive 7 | | | | | turbid |
| 0.05% | −7.8 | −7.4 | −24 | −18 | |
| 0.1% | −8.9 | −8.4 | −24 | −18 | |
| Additive 8 | | | | | turbid |
| 0.05% | −7.8 | −7.4 | −24 | −15 | |
| 0.01% | −9.2 | −8.5 | −24 | −18 | |
| Additive 9 | | | | | clear |
| 0.05% | −7.2 | −7.2 | −27 | −21 | |
| 0.1% | −8.3 | −8.2 | −27 | −21 | |
| Additive 10 | | | | | clear |
| 0.05% | −7.0 | −7.0 | −27 | −24 | |
| 0.1% | −8.1 | −8.1 | −27 | −24 | |

We claim:
1. A polymer with a number average molecular weight of 400 to 20,000 containing amino-substituted groups in its molecule, resulting from the reaction of at least one compound having a secondary amine function and containing 2 to 61 carbon atoms in its molecule and complying with the general formula:

$$R\text{---}NH\text{---}R' \qquad (I)$$

in which R and R', which can be the same or different, in each case represent an aliphatic hydrocarbon group having 1 to 60 carbon atoms, with an unsaturated polyester resulting from the condensation of at least one unsaturated dicarboxylic compound having at least one alpha ethylene unsaturation of one of the carboxylic groups with at least one aliphatic epoxidized compound, the molar ratio of the epoxidized compound to the dicarboxylic compound being approximately 0.4:1 to 1.8:1 and the molar ratio of the amino function compound to the dicarboxylic compound is approximately 0.2:1 to 1.5:1.

2. A polymer according to claim 1, wherein the dicarboxylic compound is chosen from among monounsaturated dicarboxylic acid anhydrides having 4 to 60 carbon atoms in their molecule and the aliphatic epoxidized compound from among those having 2 to 62 carbon atoms in their molecule.

3. A polymer according to claim 1, wherein the aliphatic epoxidized compound is a monoepoxidized compound of formula

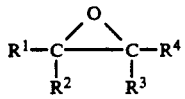 (II)

in which $R^1$ and $R^3$, which can be the same or different, in each case represent a hydrogen atom or a lower alkyl group, $R^2$ and $R^4$, which can be the same or different, in each case represent a hydogen atom, an alkyl group with 1 to 60 carbon atoms, an alkoxyalkyl group of formula $R^5$—O—$R^6$, in which $R^5$ represents an alkyl group with 1 to 59 carbon atoms and $R^6$ an alkylene group with 1 to 59 carbon atoms and in which $R^2$ can also represent an alkoxycarbonyl alkylene group of formula

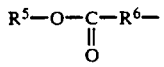

or an alkylcarbonyloxyalkylene group of formula

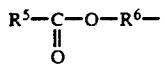

in which $R^5$ and $R^6$ have the definitions given hereinbefore.

4. A polymer according to claim 1, wherein the aliphatic epoxidized compound is a substantially linear monoepoxyalkane.

5. A polymer according to claim 1, wherein the aliphatic epoxidized compound is a compound formula

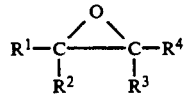 (II)

in which $R^1$ and $R^3$ represent a hydrogen atom, $R^4$ is a hydrogen atom or a substantially linear alkyl group and $R^2$ is an alkoxy carbonyl alkylene group of formula

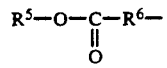

in which $R^5$ is a substantially linear alkyl group and $R^6$ a substantially linear alkylene group.

6. A polymer according to claim 1, wherein the compound having a secondary amine function is a substantially linear dialkyl amine having 6 to 56 carbon atoms in its molecule.

7. A polymer according to claim 1, wherein the compound having a secondary amine function contains 8 to 56 carbon atoms in its molecule.

8. A polymer according to claim 2, wherein the compound having a secondary amine function is a substantially linear dialkyl amine having 6 to 56 carbon atoms in its molecule.

9. A polymer according to claim 3, wherein the compound having a secondary amine function is a substantially linear dialkyl amine having 6 to 56 carbon atoms in its molecule.

10. A polymer according to claim 4, wherein the compound having a secondary amine function is a substantially linear dialkyl amine having 6 to 56 carbon atoms in its molecule.

11. A polymer according to claim 5, wherein the compound having a secondary amine function is a substantially linear dialkyl amine having 6 to 56 carbon atoms in its molecule.

12. A polymer according to claim 2, wherein the compound having a secondary amine function contains 8 to 56 carbon atoms in its molecule.

13. A polymer according to claim 3, wherein the compound having a secondary amine function contains 8 to 56 carbon atoms in its molecule.

14. A polymer according to claim 4, wherein the compound having a secondary amine function contains 8 to 56 carbon atoms in its molecule.

15. A polymer according to claim 5, wherein the compound having a secondary amine function contains 8 to 56 carbon atoms in its molecule.

16. A polymer according to claim 1, wherein the compound having a secondary amine function has, on average, alkyl chains of the following lengths in molar percent: 1 $C_{14}$, 5 $C_{16}$, 42 $C_{18}$, 12 $C_{20}$, and 40 $C_{22}$.

17. A middle distillate composition according to claim 8, wherein the compound having a secondary amine function has, on average, alkyl chains of the following lengths in molar percent: 1 $C_{14}$, 5 $C_{16}$, 42 $C_{18}$, 12 $C_{20}$, and 40 $C_{22}$.

18. Middle distillate composition, characterized in that it contains a major proportion of middle distillate having a distillation range of 150° to 450° C. and a minor proportion, adequate to simultaneously reduce its turbidity point and flow point, of at least one polymer according to claim 1, said polymer having substantially linear side chains with at least 8 carbon atoms.

19. Middle distillate composition according to claim 18, characterized in that the middle distillate consists of a gas oil fraction having a distillation range extending from an initial temperature of approximately 160° to 190° C. to a final temperature of approximately 360° to 430° C.

20. Middle distillate composition according to claim 18, wherein the proportion of the polymer is 0.001 to 2% by weight.

* * * * *